Aug. 16, 1927.

G. K. VIALL 1,639,543

CLUTCH AND BRAKE CONTROL MECHANISM

Filed Dec. 29, 1925   4 Sheets-Sheet 1

Aug. 16, 1927.

G. K. VIALL 1,639,543

CLUTCH AND BRAKE CONTROL MECHANISM

Filed Dec. 29, 1925     4 Sheets-Sheet 2

Inventor
George Kenneth Viall
By John S. Barker
Attorney

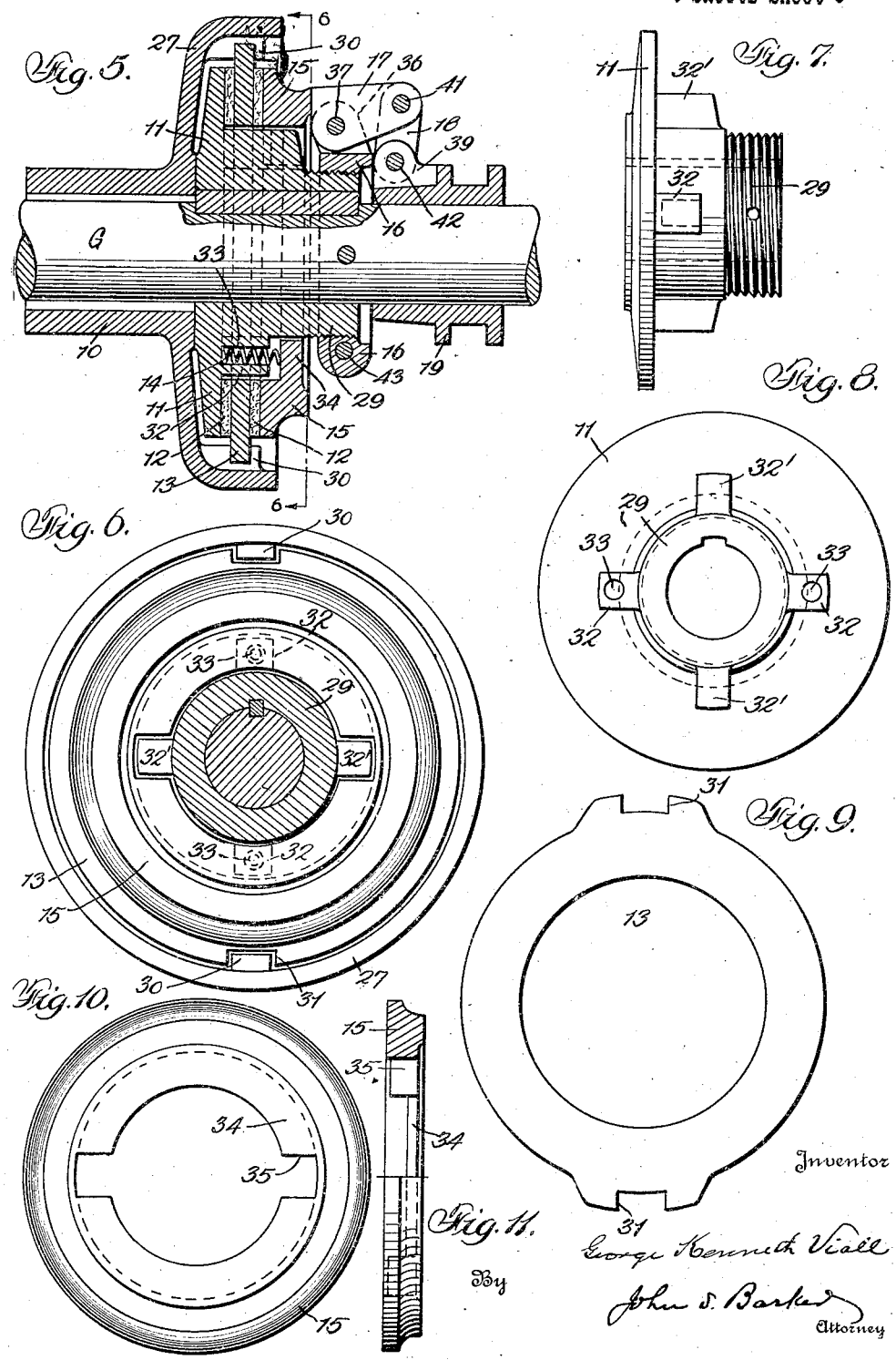

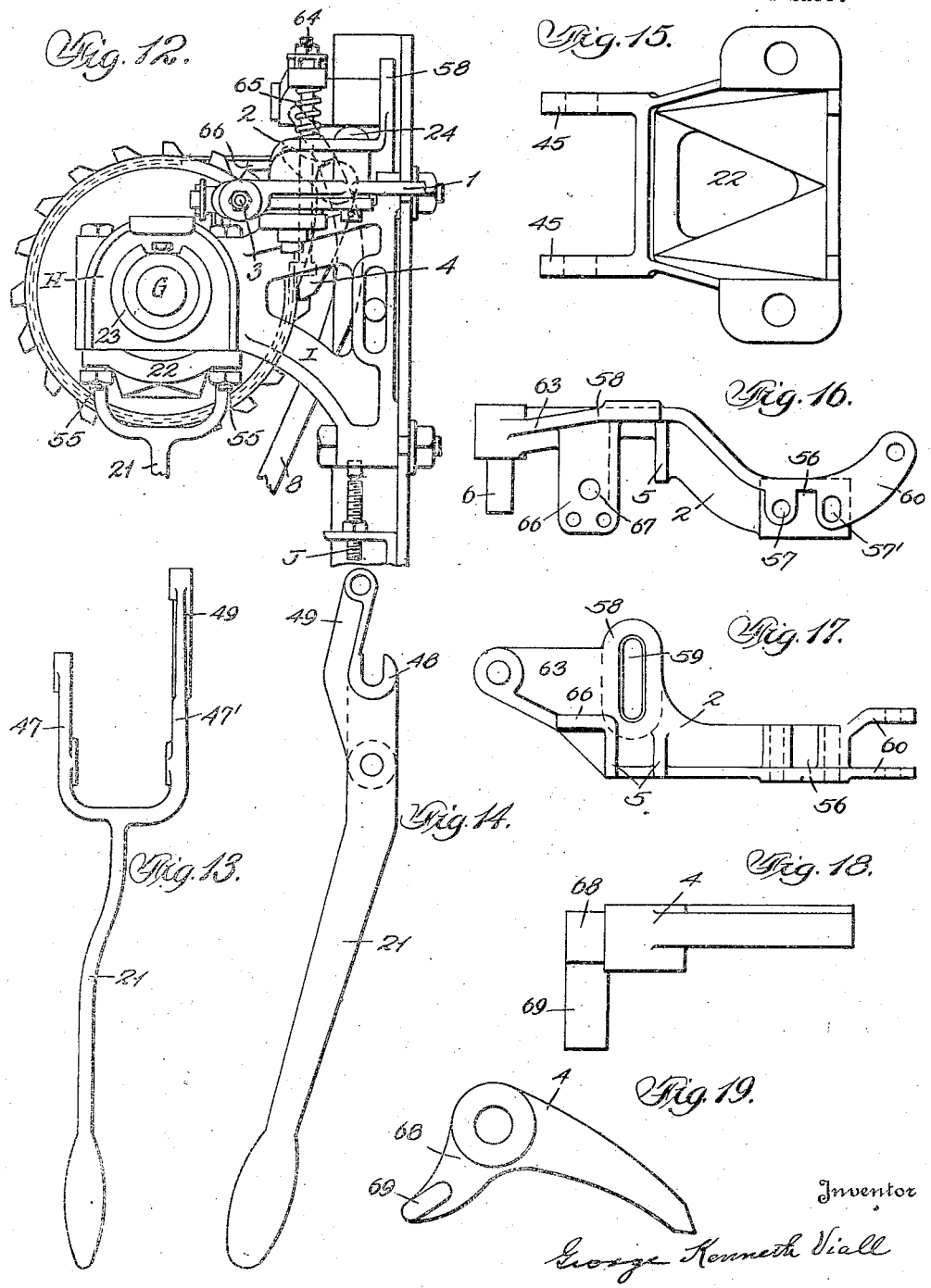

Patented Aug. 16, 1927.

1,639,543

UNITED STATES PATENT OFFICE.

GEORGE KENNETH VIALL, OF MILWAUKEE, WISCONSIN, ASSIGNOR TO CHAIN BELT COMPANY, OF MILWAUKEE, WISCONSIN, A CORPORATION OF WISCONSIN.

CLUTCH AND BRAKE CONTROL MECHANISM.

Application filed December 29, 1925. Serial No. 78,212.

My invention relates to automatic clutch and brake control mechanism, especially adapted for use in connection with concrete mixing machines.

In the accompanying drawings, in which is illustrated the preferred embodiment of my invention—

Fig. 3 is a top plan view of some of the parts shown in Figs. 1 and 2.

Fig. 5 is a sectional view illustrating the clutch controlling the winding drum.

Fig. 6 is a cross sectional view on the line 6—6 of Fig. 5.

Fig. 7 is an elevation of the master disk of the clutch.

Fig. 8 is a face view thereof.

Fig. 9 is a face view of the floating friction plate of the clutch.

Fig. 10 is a face view of the front face of the clutch; and Fig. 11 is an edge view thereof, one half in section.

Fig. 12 is an elevation of the parts illustrated in Fig. 3 as seen from the right of said view.

Fig. 13 is a side view of the clutch shifting lever; and Fig. 14 is an edge view thereof.

Fig. 15 is a plan view of the bracket in which the clutch shifting lever is supported.

Fig. 16 is a side view of the supporting bracket 2; and Fig. 17 is a plan view thereof.

Fig. 18 is a plan view of the pawl 4; and Fig. 19 is a side elevation thereof.

Figure 1:
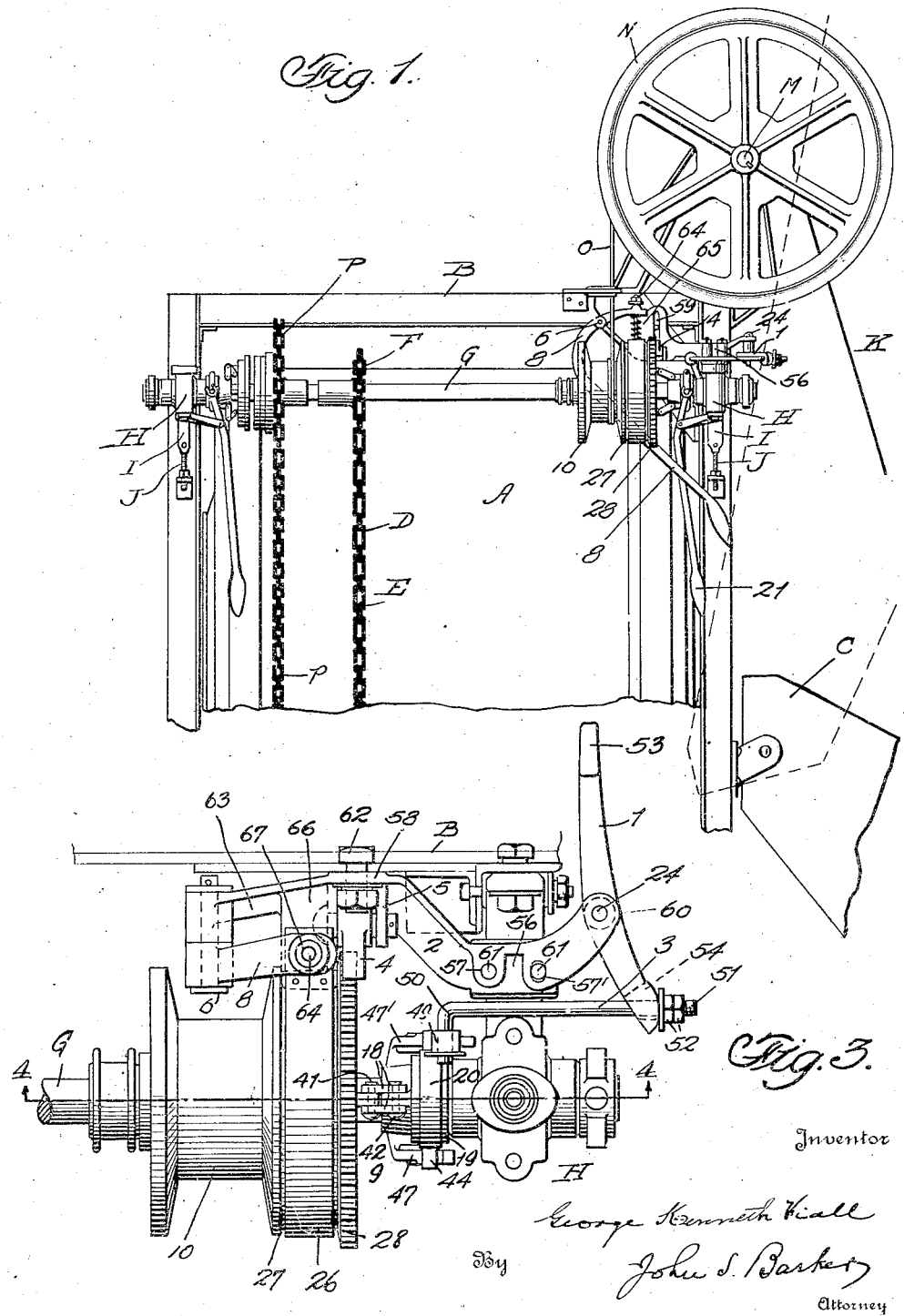
Figure 1 is a side elevation of my invention, and such parts of a concrete mixing apparatus as are necessary to illustrate the application of the invention thereof, some of the parts being broken away.
Figure 2:
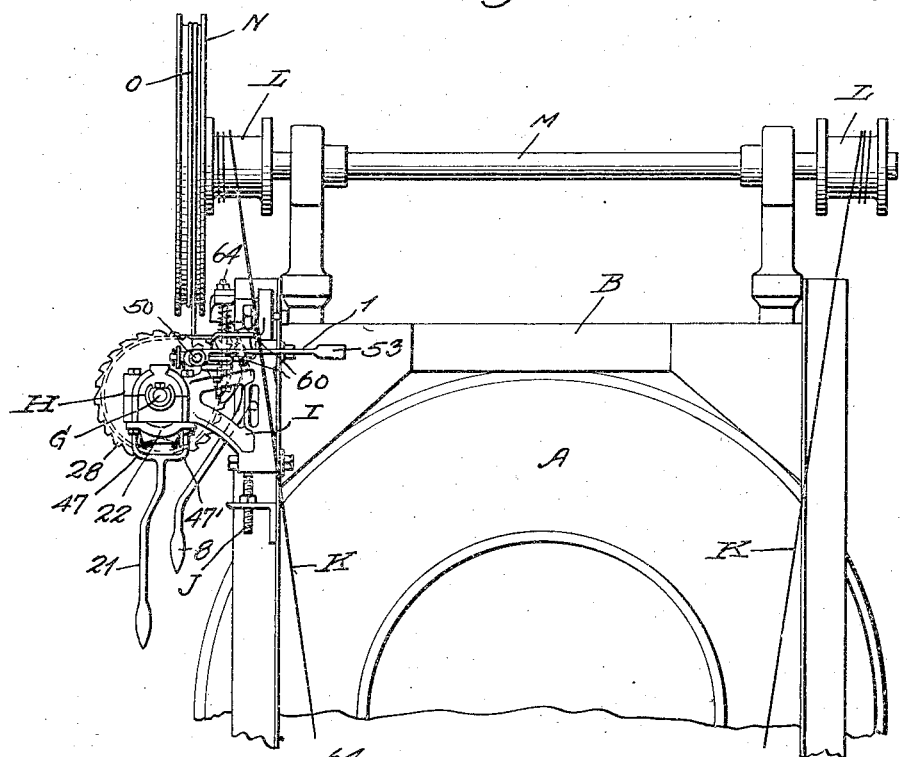
Fig. 2 is an elevation taken at right angles to Fig. 1, some of the parts of the concrete mixer shown in the other view being omitted.
Figure 4:
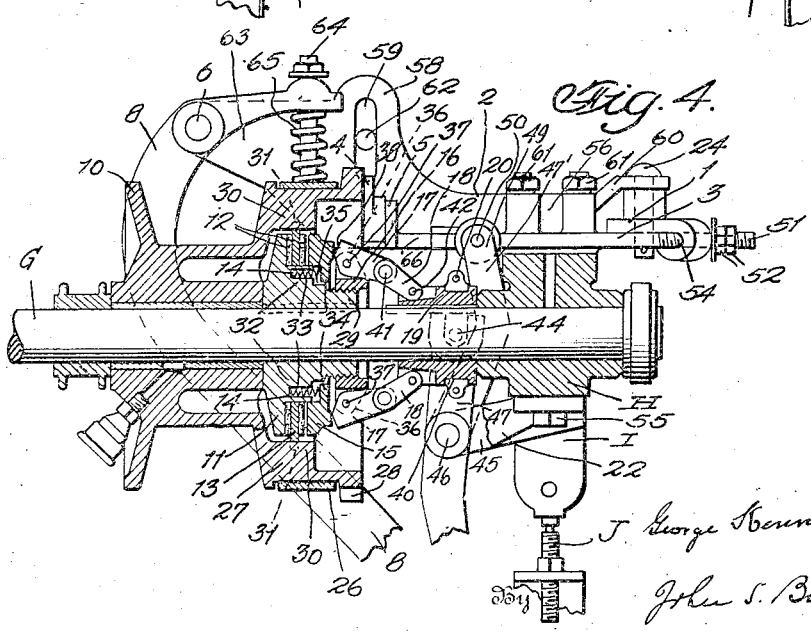
Fig. 4 is a central longitudinal sectional view taken on the line 4—4 of Fig. 3.

In the drawings A represents the drum of a concrete mixer, B the framework in which it is supported, and C the loading skip or chute for the mixer, through which material is delivered.

D indicates the driving sprocket chain that encircles the drum, engaging with a sprocket rack E attached to the periphery of the latter. The chain D engages with a sprocket wheel F upon a countershaft G, supported in self-aligning bearings H, mounted in brackets I secured to the framework. The brackets are adjustable, screws J being employed for this purpose, and are formed with slots through which pass the bolts by which they are secured fast to the framework after adjustment. The reason for making the brackets adjustable is that the tension of the chain may be controlled by setting the brackets as may be required.

The delivery end of the charging spout is pivotally supported adjacent to the feed end of the drum, and the movements of such spout are controlled by cables K, which wind upon drums L, secured to a cross shaft M. On this shaft near one end is a large grooved wheel or drum N for a cable O, that goes to a hoisting drum 10 on the countershaft G, which is the power shaft of the apparatus being described. This shaft carries a sprocket wheel P with which engages a drive chain, $p$, leading to a motor or other primary source of power.

The parts thus far described are of well known construction, and are represented and referred to for a better understanding of the invention, their use herein being typical and not intended to restrict or limit the invention to the particular apparatus shown.

The hoisting drum 10 is loosely supported upon the shaft G, but is adapted to be connected therewith through a clutch mechanism, preferably of the multiple friction disk type. The hoisting drum is rigid with a brake drum 27, being preferably formed integral therewith, and the outer peripheral edge of the brake drum is provided with a set of ratchet teeth 28. Within a chamber housed by the brake drum is mounted a clutch which is represented as consisting of a master friction disk 11 splined to shaft G so as to turn therewith, a floating intermediate friction plate 13 connected with the hoisting drum so as to turn with it, and an outer or front friction plate 15 that is connected with the master friction disk 11. The intermediate floating disk or plate 13 lies between the disks or plates 11 and 15, and the coacting faces of these clutch plates are provided with the usual friction facings 12. The master disk 11 is formed with a hub, the outer end portion 29 of which is screw-threaded, while the intermediate portion, between the part 29 and the portion constituting the friction plate, is formed with a series of radial projections 32, 32 and 32', 32', the outer faces of which are finished on the arcs of a circle concentric with the shaft G, so that these lugs form an interrupted or broken cylindrical bearing on which slide the friction plates 13 and 15, the former being free to turn upon such bearing, while the latter is connected with the master disk 11 so as to rotate therewith, although free to slide axially relative thereto, by means presently to be described. The lugs 32' preferably alternate with the lugs 32. The latter have formed in them sockets or recesses 33 in which are seated springs 14, the outer ends of which engage with an inwardly extending web portion 34 of the outer friction disk 15, and since the springs rest at their inner ends against the master disk 11 they tend normally to separate and hold apart, and out of engagement, the friction surfaces of the clutch plates. The intermediate floating friction disk 13 is formed with peripheral slotted lugs 31 which are adapted to engage with ribs 30 projecting inwardly from the friction drum 27. This arrangement insures that the intermediate friction disk 13 shall turn with the hoisting drum, which latter, as has been described, is loosely supported upon the shaft G. The web portion 34 of the outer friction plate 15 is slotted and reinforced at 35, so as to engage with the lugs 32' and thus have such connection with the master disk 11 as to cause it to rotate therewith. It thus follows that when the friction faces are separated, by the springs 14, the cable drum remains at rest, but when the friction faces of the disk are forced into engagement with each other, the drum is caused to rotate with the shaft G.

Supported upon the screw-threaded portion 29 of the hub of the master disk 11 is an adjustable ring 16 which is preferably split and provided with a screw bolt 43 or other means by which it may be firmly set after being adjusted to the desired position. This ring is formed with two sets of perforated lugs 36, in which are seated pivot pins 37 on which are supported the clutch-operating fingers or cam links 17 that serve to force together the friction plates of the clutch. The outer ends of the fingers 17 are connected by toggle links 18 with a sliding collar 19 loose upon the shaft G. The pivot pins connecting the links 17 and 18 are designated 41, and those uniting the toggle links 18 with the collar 19, 42. The inner ends of the clutch-operating links or fingers 17 are formed into cams 38 that act directly upon the outer friction disk 15, when the collar 19 is moved inwardly or toward the friction clutch. The collar 19 is formed with a yoke or ring seat 40 for the clutch shifter 20 which is preferably formed of two parts for convenient application, and is formed with a pair of diametrically disposed radial studs 44 with which engage the yoke of a clutch shifting lever 21. This lever is pivotally supported in a bracket 22 that is secured, by bolts 55, to the adjustable bracket I, below the bearing H. This bracket is formed with a pair of arms 45 between which lies the yoke portion of the clutch shifting lever, being united thereto by pivot pin 46. The upper end of the lever 21 is shaped into a yoke, the arms 47, 47' of which straddle the shaft G and are at their ends fashioned, as at 48, to engage with the studs 44 of the clutch shifting collar. One of the arms 47' is formed with an extension 49 with which engages the bent or hook end 50 of a knock-out rod 3. The other end of this rod is screw-threaded at 51 and is caused to have adjustable engagement, by means of the nuts 52, with the knock-out lever 1. This lever is pivoted in a bracket 2 that is secured fast to the frame bracket I. One end of the knock-out lever 1 is connected, as stated, with the knock-out rod 3, being preferably perforated, as shown at 54, to receive the rod, while the other end, 53, of the lever is in position to be engaged by the loading skip or charging spout C when it is elevated and comes to position to deliver its load into the mixing drum. The bracket member 2 is formed with a horizontal plate portion 56 that is adapted to be connected, by the bolts 61, with a member of the frame bracket I located in a plane above the shaft G. The plate 56 of the bracket is perforated at 57, 57', to receive the connecting bolts 61, and one of these perforations, 57', is elongated to form a slot to permit adjustment. The bracket 2 is also formed with a vertical plate 58 adapted to bear against a part of the framework B and to be secured thereto by a bolt 62, the plate 58 having formed in it a slot 59 through which passes the bolt 62, to allow for adjustment. These adjustments that have just been referred to are required by reason of the fact that the frame bracket I is adjustable as has been described. A pair of perforated arms 60 extend from the horizontal plate portion 56 of the bracket 2, and between these lies the knock-out lever 1, it being secured to the bracket by the pivot pin 24.

The bracket 2 also supports the brake operating mechanism, which will now be described. 26 designates the brake band which encircles the brake drum 27. One end of this brake band is secured fast to a horizontal shelf or plate 66, extending out from the bracket 2, whence it passes around the brake drum in the direction the drum turns to pay out the cable O. The other, or free, end of the brake band carries a connecting rod or link 64 which extends upward through a perforation 67 in the shelf 66 and is connected with the brake lever 8. The latter is pivotally supported on a pin or stud 6 extending outward from a member 63 of the bracket 2. A coiled spring 65 surrounds the link 64, one of its ends resting upon the shelf 66, and the other bearing against the brake lever 8. The spring is under sufficient compression to set the brake band against the face of the brake drum so that when the latter turns in a direction to pay out the cable O the band will be caused to grip the drum with sufficient force to hold the skip in the position to which it may be elevated. When it is desired to lower the skip the brake lever 8 is manually operated, easing the brake and allowing the skip to fall.

4 designates a pawl that may be caused to engage with the ratchet teeth 28 carried by the brake drum. It is pivotally supported between lugs 5 extending outward from the bracket 2. The pawl is provided with an arm 68 from which extends a piece 69 that acts as a counterweight to normally keep the pawl from engagement with the ratchet teeth 28.

This pawl operates to positively hold the cable drum against reverse rotation and is used only when the apparatus is being transported from place to place, or when, as an element of safety, it is desired to positively hold the loading skip in an elevated position.

The operation of the apparatus described is as follows: The skip, being in its lowermost position and having been loaded, is to be raised into the position shown in dotted lines in Fig. 1 to discharge its load into the mixing drum. The operator of the apparatus moves the clutch lever in a direction to shift the clutch and connect the hoisting drum 10 with the power shaft G. The rotation of the drum winds up the hoisting cable, whereupon the loading skip is elevated. As the latter comes to the proper position to discharge and to be arrested, it engages with the knock-off lever 1, which is thereby shifted, its movement automatically shifting the clutch and disconnecting the hoisting drum from the power shaft.

The hoisting drum is now free and the skip will begin to fall, but as soon as the drum begins the reverse rotation the brake, by reason of its construction as described, immediately acts and operates to hold the parts with the loading skip in elevated position until such time as it is desired to allow the skip to fall into position to be loaded. Then the operator moves the brake lever against the action of the spring, and the skip falls by gravity.

As has been stated, the hoisting clutch and brake mechanism described has been devised with particular reference to use in connection with a concrete mixer driven by sprocket chain and provided with adjustable brackets supporting the power shaft and permitting the adjustment of parts to maintain proper tension upon the sprocket chain.

What I claim is:

1. The combination of a power shaft, supports therefor adjustable to permit the position of the shaft to be changed, gearing taking power from the shaft, including a clutch and a brake mechanism, and means for operating the clutch and the brake supported by the adjustable supports of the shaft, whereby adjustment of the said supports to change the position of the shaft does not affect the relations of the said operating devices to the parts they control.

2. The combination of a rotating vessel, a movable delivery chute associated therewith, a power shaft and gearing for rotating the vessel, supports for the shaft, adjustable so that the position of the shaft may be changed and the gearing maintained in proper working conditions, other gearing between the power shaft and the delivery chute through which the latter is moved, including a clutch and a brake, and means for operating the clutch and the brake carried by the adjustable supports for the power shaft.

3. The combination of a rotating vessel, a movable delivery chute associated therewith, a power shaft, sprocket chain gearing between the shaft and vessel for rotating the latter, adjustable supports for the shaft, other gearing between the power shaft and the said delivery chute through which the latter is operated, including a clutch and a brake, and means for operating the clutch and the brake carried by the adjustable supports for the power shaft.

4. The combination of a rotary mixing drum, a charging delivery chute therefor, a power shaft, sprocket gearing between the shaft and mixing drum for rotating the latter, adjustable supports for the shaft, other gearing between the power shaft and the said charging chute, including a clutch and a brake, and means for operating the clutch and the brake carried by the adjustable supports for the power shaft.

5. In a concrete mixer, the combination of a mixing drum, a power shaft, sprocket chain gearing between the power shaft and drum by which the latter is driven, adjustable supports for the shaft permitting its position to be changed to maintain proper tension of the sprocket chain, a loading skip for the mixing drum, cable gearing between the shaft and skip by which the latter is moved to charging position, such gearing including a clutch controlling connection with the power shaft and a brake controlling the movements of the skip, means for operating the clutch and the brake, and supports for the said operating means carried by the adjustable supports for the shaft.

6. The combination stated in claim 5, having the supports for the said operating means (brake operating and clutch operating) located on opposite sides of the shaft.

7. In mechanism for controlling the operation of a delivery chute, the combination with the chute and a cable by which it is moved, of a drum on which the cable is wound, a power shaft, a clutch for connecting the drum with the power shaft, a brake for controlling the movements of the drum arranged to be automatically set when the drum reverses, manually operated brake control means, and a trip to move the clutch to release the drum and allow the skip to descend and thereby reverse the drum and automatically set the brake.

8. In mechanism for controlling the operation of a delivery chute, the combination with the chute and a cable by which it is moved, of a drum on which the cable is wound, a power shaft, a clutch for connecting the drum with the power shaft, manual clutch control means, automatic clutch control means operated by the chute when it comes to a determined elevated position for disconnecting the chute from the power shaft, a brake for the drum arranged to be set automatically when the drum reverses, and a separate manual control means for releasing the brake.

9. In mechanism for controlling the operation of a delivery chute, the combination with the chute and a cable by which it is moved, of a drum on which the cable is wound, a power shaft, a clutch for connecting the drum with the power shaft, a brake drum connected with the cable drum, a brake band surrounding the brake drum, a spring holding the band in engagement with brake drum, the band being arranged to be set tightly when the cable drum commences to reverse, and separate manual control means for releasing the brake.

10. In mechanism for controlling the operation of a delivery chute, the combination with the chute and a cable by which it is moved, of a drum on which the cable is wound, a power shaft on which the drum is supported, a clutch for connecting the drum with the power shaft, a manual clutch shifter formed with a yoke that straddles the shaft, and trip mechanism connected with one arm of the yoke arranged to be operated by the delivery chute when it comes to a determined position in its movement, for shifting the clutch to disconnect the cable drum from the power shaft.

11. In mechanism for controlling the operation of a delivery chute, the combination with the chute and a cable by which it is moved, of a drum on which the cable is wound, a power shaft on which the drum is supported, a bearing in which the shaft is mounted, a clutch for connecting the drum with the power shaft, a manual clutch shifter having a pivotal support carried by the shaft bearing located on one side of the shaft, and an automatic shifter for the clutch operated by the chute when it comes to a determined position in its movement and supported by the said bearing.

12. In a concrete mixer, the combination of a mixing drum, a charging delivery chute therefor, a power shaft from which the drum is driven, adjustable supports for the shaft, a cable drum supported on the power shaft, a cable winding on the drum by which the movements of the charging chute are controlled, a clutch connecting the cable drum with the power shaft, automatic means for operating the clutch from the charging chute when it comes to a determined position, a brake for controlling the movements of the cable drum, a manual brake control lever, and a bracket secured to one of the adjustable bearings for the power shaft acting as a support for the automatic clutch shifter and the brake lever.

GEORGE KENNETH VIALL.